United States Patent
Muto et al.

(10) Patent No.: US 7,617,334 B2
(45) Date of Patent: Nov. 10, 2009

(54) DATA PROCESSING SYSTEM, DATA PROCESSING METHOD AND PROGRAM

(75) Inventors: Junichi Muto, Odawara (JP); Isamu Kurokawa, Odawara (JP); Shinichi Hiramatsu, Odawara (JP); Takuya Ichikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/143,539

(22) Filed: Jun. 20, 2008

(65) Prior Publication Data

US 2008/0256264 A1    Oct. 16, 2008

Related U.S. Application Data

(63) Continuation of application No. 11/142,262, filed on Jun. 2, 2005, now abandoned.

(30) Foreign Application Priority Data

Mar. 30, 2005    (JP) .............................. 2005-098971

(51) Int. Cl.
 G06F 3/00    (2006.01)
 G06F 13/28   (2006.01)
 G06F 15/76   (2006.01)
 G06F 9/00    (2006.01)

(52) U.S. Cl. ..................... 710/5; 710/6; 710/7; 710/20; 710/21; 710/24; 712/34; 712/35; 712/226; 719/313; 719/328

(58) Field of Classification Search ....................... None
See application file for complete search history.

(56) References Cited

U.S. PATENT DOCUMENTS

| | | | | |
|---|---|---|---|---|
| 3,798,613 | A | * | 3/1974 | Edstrom et al. ................ 710/14 |
| 4,272,815 | A | * | 6/1981 | Kadowaki et al. ............. 710/21 |
| 5,060,142 | A | | 10/1991 | Menon et al. |
| 5,740,391 | A | * | 4/1998 | Hunt ........................... 712/200 |
| 5,901,327 | A | * | 5/1999 | Ofek ............................. 710/5 |
| 2002/0052985 | A1 | * | 5/2002 | Furuumi et al. ................. 710/5 |

FOREIGN PATENT DOCUMENTS

JP    2001-125866    5/2001

* cited by examiner

Primary Examiner—Henry W. H. Tsai
Assistant Examiner—Michael Sun
(74) Attorney, Agent, or Firm—Antonelli, Terry, Stout & Kraus, LLP.

(57) ABSTRACT

In the host, an IP issues CCW, and a CH encodes the CCW and a CCW chain by the encode program to create a code including the description of controlling a conditional branch with the DKC and transmits the code to a PORT in the DKC. In the DKC, the PORT decodes the code by the decode program, and a CP sequentially processes each command obtained by the decoding and returns a return code representing the end state of the processing. The host receives the return code to recognize the end state of the processing.

9 Claims, 10 Drawing Sheets

FIG. 9
CCW CHAIN

| # | ADDRESS | COMMAND COE | CHAIN | PARAMETER | COMMAND | |
|---|---|---|---|---|---|---|
| 1 | X00000000 | 8B | EXISTENCE | 10010000 00020000 01 | TEST MEM | (BRANCH) |
| 2 | X00000008 | 08 | EXISTENCE | 00000040 | Tic | MISMATCHING |
| 3 | X00000010 | 8B | EXISTENCE | 10010001 00020000 01 | TEST MEM | MATCHING (JUMP) |
| 4 | X00000018 | 08 | EXISTENCE | 00000042 | Tic | |
| 5 | X00000020 | 8B | EXISTENCE | 10010002 00020000 01 | TEST MEM | MATCHING |
| 6 | X00000028 | 08 | EXISTENCE | 00000044 | Tic | MISMATCHING (JUMP) |
| 7 | X00000030 | 8B | NOTHING | 11ffnnnn nnnnnn | T&S | END |
| 8 | X00000038 | 00 | NOTHING | | PROGRAM END | END |
| 9 | X00000040 | 83 | NOTHING | 52 | ALW CRS | END |
| 10 | X00000042 | 83 | NOTHING | 52 | ALW CRS | END |
| 11 | X00000044 | 83 | NOTHING | 52 | ALW CRS | |

DATA PROCESSING SYSTEM, DATA PROCESSING METHOD AND PROGRAM

CROSS-REFERENCE TO RELATED APPLICATION

This application is a continuation of U.S. application Ser. No. 11/142,262, filed Jun. 2, 2005, now abandoned and which application claims priority from Japanese Patent Application No. JP 2005-98971 filed on Mar. 30, 2005, the contents of which are hereby incorporated by reference into this application.

TECHNICAL FIELD OF THE INVENTION

The present invention relates to a data processing system to perform a command processing between data processing apparatuses, especially relates to a technology for processing commands and relevant data between a storage control unit such as a disk control unit (referred to as a DKC) in a disk array apparatus (referred to as a storage apparatus) and a host computer (referred to as a host).

BACKGROUND OF THE INVENTION

Conventionally, in the data processing system wherein the host and the disk array apparatus is connected through the channel for communication, generally, the host issues and transmits CCW (channel command word) to the DKC to make the DKC perform the command processing. Particularly, the host issues and transmits a CCW chain to the DKC in order to make the DKC continuously perform processing operation and jobs between the host and the DKC. The CCW chain has various kinds such as a CCW chain for controlling the data write to the storage unit such as a HDD (hard disk drive).

In a configuration example of the conventional data processing system as show in FIG. 8, a host 901 issues a plurality of CCWs 801 as a CCW chain 802 and transmits them to a DKC 902 in a disk array apparatus 900 to make the DKC 902 process a CCW chain 804 and a CCW 805. For example, the host 901 issues the CCW chain 802 as shown in FIG. 9 to make the DKC 902 perform one processing operation and job. When the CCW chain 802 is processed between the host 901 and the DKC 902, an IP 111 creates the CCW chain 802 in a MS 112 in the host 901. A CH 113 transmits the CCW chain 802 as a frame 803 of the CCW 801 to a PORT 121 of the DKC 902. The frame 803 of the CCW 801 is received at the PORT 121 of the DKC 902 so that the CCW chain 804 is obtained by the DKC 902. A CP 123 sequentially processes each CCW 805 constituting the CCW chain 804. The PORT 121 transmits response status of the processing result of the CCW 805 to the CH 113.

The CCW 801 and the CCW 802 issued from the host 901 may include, for example, a search condition. The search condition is information of the condition for a search processing performed in the DKC 902. The DKC 902 performs the search processing to the CCW 805 according to the search condition. The result of the search processing is returned to the host 901 as a response status. The search processing is, for example, performed in order to check whether or not the value in the memory area of the DKC 902 is matched with the value for the search condition. The host 901 determines the CCW 801 to be issued subsequently based on the state of the CCW 801 including the search condition in the DKC 902 and the response status from the DKC 902 according to the processing result.

Japanese Patent Application Laid-Open Publication No. 2001-125866 describes a technology for reducing an overhead in communication between the CPU and the DKC, namely a technology for batch processing of a plurality of CCWs and performing a recovery processing as in the independent processing even if the CCW is abnormally ended in the batch processing.

SUMMARY OF THE INVENTION

If a plurality of CCWs are issued as described in the background art, information such as headers is added to each CCW and its parameter. Thus the channel between the host and the DKC is burdened with overhead and the traffic on the path is increased. Additionally, the status information is exchanged for each CCW and the traffic is further increased.

Thus, in order to reduce the overhead of the channels and the traffic of the paths, the method of transferring and processing collectively a plurality of CCWs as the CCW chain is disclosed in the above described Japanese Application Laid-Open Publication No. 2001-125866. However, the above described method is of sequentially processing the CCWs. If a plurality of CCWs include a conditional branch such as a jump instruction, the executable sequence of the CCWs is changed in accordance with the response from the DKC. Therefore, the above method can not collectively transfer a plurality of CCWs through the path of the channel. Additionally, when the DKC processes the plurality of CCWs including the conditional branch, it is difficult to determine the position at which the process is ended in the program. Therefore, the host can not know whether the process is normally performed for each CCW of the CCW chain.

The present invention has been made in consideration of the above-mentioned problem. An object of the present invention is to provide a technology used in a data processing system wherein a first data processing apparatus such as the host to issue the command and a second data processing apparatus such as the DKC to process the command are communicatively connected. By collectively processing the group of a plurality of command words (CW) including the conditional branch at the first data processing apparatus and the second data processing apparatus, the load on the processing including CW transfer between the first and second data processing apparatuses is reduced to improve the process performance.

The following is a brief description of the gist of the representative elements of the invention disclosed in this application. In order to achieve the above described object, the first data processing apparatus such as the host to issue the command (CCW) and the second data processing apparatus such as the storage control unit (DKC) to process the command are communicatively connected in the data processing system of the present invention. The data processing system includes the following technical means. The disk array apparatus comprises a storage unit and a disk control unit (DKC) for controlling of data storage to the storage unit. The disk array apparatus achieves RAID control. The DKC inputs/outputs data to the storage volume responsive to commands and requests from the host.

(1) In the data processing system according to the present invention, the first data processing apparatus encodes a group of a plurality of command words (CWs) to create a code including a description of controlling the conditional branch and transmits the code collectively to the second data processing apparatus to process them. Thus the plurality of CWs is batched in order to perform a sequential processing operation and job including the conditional branch according to the state and the processing result in the second data processing apparatus through the communication processing between the first data processing apparatus and the second data processing apparatus. The first data processing apparatus can perform the batch processing with the code in the case of a process by the CW chain that the conditional branch is not included and a plurality of CWs are sequentially performed, and in the case of a process by the plurality of CWs including the conditional branch. When the batch processing is performed, the first data processing apparatus encodes by executing an encode program and the second data processing apparatus decodes corresponding to the encoding by the executing a decode program, respectively.

In the data processing system according to the present invention, the first data processing apparatus comprises an arithmetic processing unit to execute programs, issue the command and process the input/output data to the storage volume, a storage unit to store various data or information relating to the process by the first data processing apparatus, such as programs, the command, the input/output data and control information and an input/output channel unit to control communication with the second data processing apparatus including the command transferring.

The second data processing apparatus comprises a control processor unit to control the storage regarding the input/output data and perform the command processing corresponding to the command, a memory unit to store various data or information relating to the process by the second data processing apparatus, such as programs, the command, the input/output data and control information and an input/output port unit to control communication with the first data processing apparatus including the command transferring.

In the first data processing apparatus, the arithmetic processing creates a plurality of channel command words, the input/output channel unit encodes the plurality of channel command words to create a code having a command, its parameter and the input/output data and including the description of controlling the conditional branch according to the state and the processing result in the second data processing apparatus. The code portion created by the encoding is connected to behind the existing code portion. Thus the code in the form of one data stream is created.

The input/output channel transmits the created code as a flame to the input/output port. The input/output channel unit sets the code as the parameter of the flame of the command for batch processing to perform transfer processing. The input/output port unit receives the frame including the code and takes out the code.

In the second data processing apparatus, the input/output port unit decodes the code and passes it to the control processor unit. The control processor unit sequentially processes each command and its parameter obtained by the decoding according to the description of controlling the conditional branch. And the control processor unit returns status information representing the processing result. The input/output port unit transmits the status information as a response to the input/output channel unit. The input/output port unit receives the status information of the response and reports it to the arithmetic processing unit.

In the encode processing by the first data processing apparatus, the CW such as the jump instruction corresponding to the original conditional branch is encoded to the code portion that includes the CW for the conditional branch corresponding to the status of the processing result of the other CW and includes an address to be jumping destination and a label. The CW for the conditional branch corresponding to the status of the processing result of the other CW in the code is a jump instruction corresponding to the status of the processing result of the CW for the last preceding conditional determination processing. In the second data processing apparatus, the CW for the conditional branch such as the jump instruction is performed to jump the process according to the status of the result of processing the other CW. Alternatively, the CW for the conditional branch is skipped to shift to perform the next CW.

(2) The data processing system described in the above (1) according to the present invention is characterized in that: In the first data processing apparatus, the description of a return code corresponding to the end state and position of the process according to the conditional branch is included in the code by the encoding. Thereby the second data processing apparatus transmits the status information including the return code corresponding to the end state and position of the process according to the conditional branch to the first data processing apparatus as the result of the code processing. The first data processing apparatus recognizes the end state and position of the process by the return code included the status information.

Additionally, the first data processing apparatus determines the process to be performed subsequently based on the receipt of the return code. If the return code indicates that the process is normally ended, the first data processing apparatus determines the command word to be issued subsequently. Alternatively, if the return code indicates that the process is abnormally ended, the first data processing apparatus performs a recovery processing to the command word corresponding to the position at which the process is ended.

(3) The data processing method corresponding to the data processing system and the program to perform the process thereof is characterized in that: The first data processing apparatus encodes a plurality of CWs to create one code including the description of controlling the conditional branch and transmits the created code to the second data processing apparatus. The second data processing apparatus receives the code from the first data processing apparatus, decodes the code to process each CW obtained by the decoding according to the description of controlling the conditional branch. The second data processing apparatus transmits the status information corresponding to the end state and position of the process as a response to the first data processing apparatus. The first data processing apparatus receives from the second data processing apparatus the status information representing the processing result of the code as a response and recognizes the end state and position of the process.

The following is a brief description of the effects obtained from the representative elements of the invention disclosed in this application. According to the present invention, in the data processing system in which the first data processing apparatus such as the host to issue the command and the second data processing apparatus such as the DKC to process commands are communicatively connected, the first and second data processing apparatuses performs batch-processing for a group of a plurality of command words (CWs) including the conditional branch. Thus the load on the process including transferring of the CW between the first data processing apparatus and the second data processing apparatus can be reduced and the process performance can be improved.

BRIEF DESCRIPTIONS OF THE DRAWINGS

FIG. 9 is a table representing an example of a CCW chain in a configuration example of the conventional data processing system;

DESCRIPTION OF THE PREFERRED EMBODIMENTS

Figure 1:
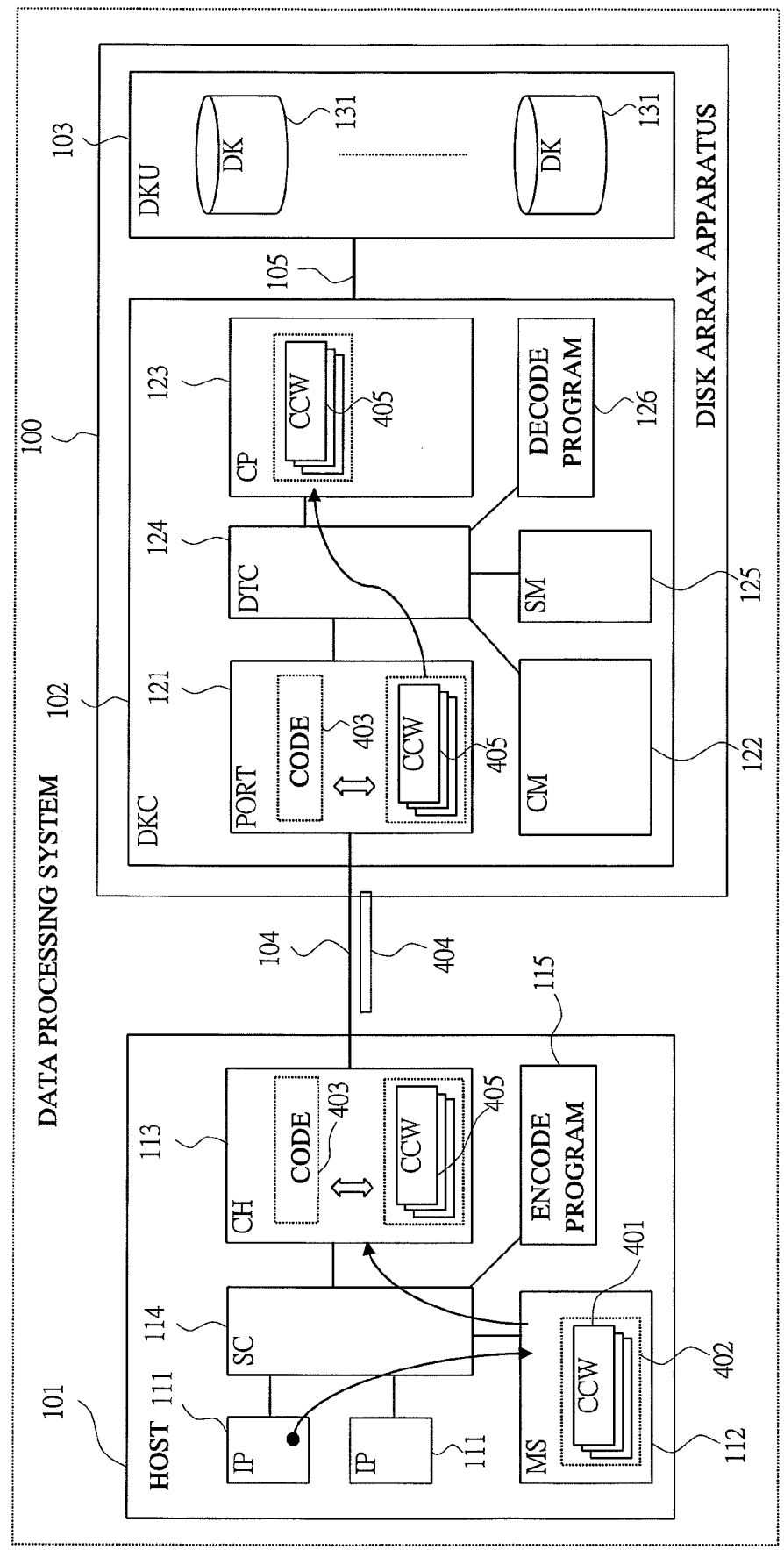
FIG. 1 is a block diagram representing the entire configuration of the data processing system and a data processing method of an embodiment according to the present invention.

An embodiment of the present invention will be described in detail with reference to the drawings. Incidentally, the same reference numerals will be used to designate the same or similar components in all drawings, and the repeating description will be omitted or simplified.

Summary

In an embodiment according to the present invention, the data processing system in which the mainframe host and the disk array apparatus are communicatively connected has a function to collectively process a plurality of CCWs including the conditional branch by the code. The host encodes the plurality of CCWs to the code of the type of describing in CWs the controlling of the conditional branch responsive to the conditions. Due to this, the plurality of command according to the response from the DKC is controlled to progress by the DKC using the description of code in place of the host that had been controlling the progress. When a plurality of CCWs and CCW chain are processed by the DKC, the host encodes the plurality of CCWs to create a code in a predetermined format and transmits the created code as one flame to the DKC. The DKC decodes the code included in the received flame to sequentially perform CCW processing. Particularly in the encoding process, the host creates the code describing the control of the conditional branch in CCW when the process including the conditional branch according to the state and the processing result in the DKC is performed. In the decoding, the DKC performs a conditional determination processing in accordance with the description of controlling the conditional branch in the decoded CCW and branches the process in accordance with the state and the processing result in the DKC to perform each CCW processing. Then the DKC returns to the host status information corresponding to the end state and position of the process according to the conditional branch.

In order to clearly represent the feature of the present embodiment, the conventional data processing system and the data processing method to be compared with the present embodiment will be described with reference to FIGS. 8-10.

<Conventional Configuration>

Figure 8:
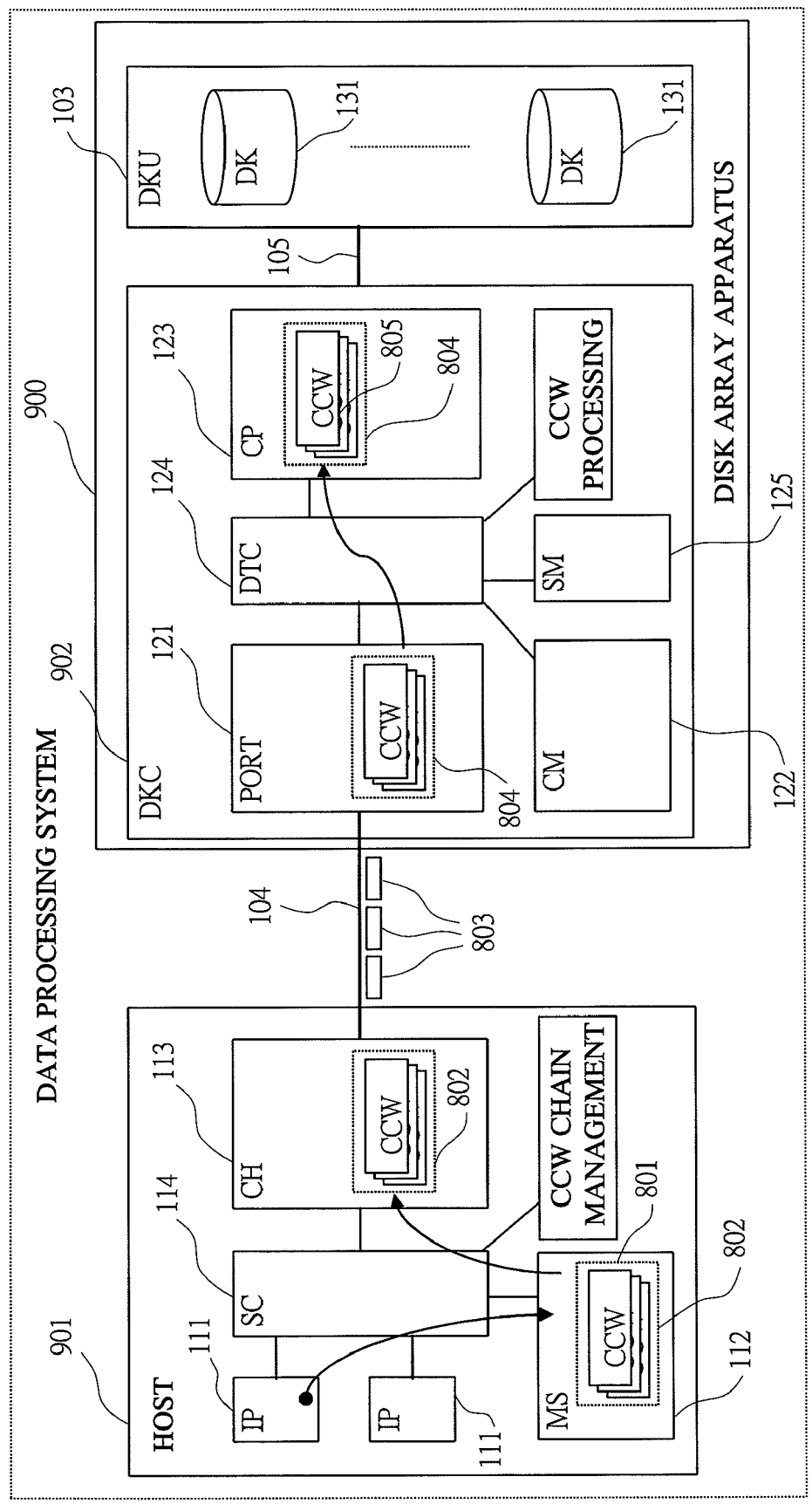
FIG. 8 is a block diagram representing a configuration example of the conventional data processing system and data processing method to compare with the present embodiment.

FIG. 8 represents a configuration example of the conventional data processing system and data processing method. FIG. 9 is a table representing a example of a CCW chain in a configuration example of the conventional data processing system. FIG. 10 is a sequence diagram representing processing of the CCW chain between the host and the DKC in a configuration example of the conventional data processing system. As an example, a mainframe data processing system in which a mainframe host 901 and a disk array apparatus 900 are communicatively connected is represented.

The data processing system according to FIG. 8 comprises the host 901 and the disk array apparatus 900. The host 901 is connected to the DKC 902 through a path 104. The DKC 902 and a DKU (disk unit) 103 are connected through a path 105 in the disk array apparatus 900. The DKU 103 includes a plurality of disk drives (DKs) 131 such as HDDs.

The host 901 issues a plurality of CCWs 801 and makes the disk array apparatus 900 perform processing operation and job using a CCW chain 802 as a group of the CCWs in this system. The host 901 transmits the CCW chain 802 to be sequentially performed in the DKC 902 to the DKC 902 through the path 104 of the channel between the host 901 and the DKC 902 to make the DKC 902 sequentially process each CCW 805.

The host 901 includes an arithmetic processing unit (IP) 111, a main storage unit (MS) 112, an input/output channel unit (CH) 113 and a system controller (SC) 114. The host 901 issues and transmits the CCW 801 to the DKC 902 to perform various data processing such as data input/output to the storage volume of the disk array apparatus 900 and the control thereto. The host 901 accesses to DKC 902 by Read/Write command through the path 104 of the channel between the DKC 902 and the host 901 to read/write data to the storage volume. The host 901 especially has a function to control the CCW chain 802 comprised of a plurality of CCWs 801 to control to progress the processing of each CCW 801. The host 901 controls the data processing by executing programs and hardware logic, issues a plurality of CCWs 801, transmits the CCWs 801 and the CCW chain 802 to the DKC 901, receives a response status and control to progress the CCW chain 802.

The DKC 902 includes an input/output port unit (PORT) 121, a cache memory unit (CM) 122, a control processor unit (CP) 123, a data transfer control unit (DTC) 124 and a shared memory unit (SM) 125. The DKC 902 has a function for storage control such as data input/output to the storage volume and particularly, a function to process the command corresponding to each CCW. The DKC 902 reads/writes data to the storage volume of the DKU 103 responsive to the command from the host 901.

Generally, the CCW chain 802 has been processed as follows. In the host 901, the IP 111 creates the CCW chain 802 as shown in FIG. 9 in an region of the MS 112. The CH 113 sequentially transfers the CCW chain 802 in the form of the frame 803 for each CCW 801 through the path 104 of the channel to the PORT 121 of the DKC 902. The DKC 902 obtains a CCW chain 804 (equivalent to the CCW chain 802) from the frame 803 of the CCW 801 received at the PORT 121. The CP 123 sequentially processes each CCW 805 (equivalent to the CCW 801) of the CCW chain 804. According to these procedures, the processing operation and job corresponding to the CCW chain 802 can be achieved.

Incidentally, data and information of the CCW chain 804 received at the PORT 121 in the DKC 902 is stored once in the region such as the CM 122 and the SM 125 and the stored data and information may be retrieved to process by the PORT 121 and the CP 123.

When the CCW chain 802 is processed, the CCW 801 issued by the host 901 may include the search condition of the DKC 902. The CCW 801 including the search condition is issued and then a search process according to the search condition is performed in the DKC 902. The search result is returned from the DKC 902 to the host 901 as a response status. The search process is performed to check whether or not the value of the memory area in the DKC 902 is matched with the conditional value. The host 901 determines the CCW 801 to be issued subsequently based on the response status from the DKC 902 including the search condition of the CCW 801 and issues the next CCW 801 according to the determination. The host 901 branches the process to be performed by the DKC 902 according to the response status of the CCW 801.

<Conventional CCW Chain>

The CCW chain 802 is an group consisting of a plurality of associated CCWs for executing the sequential command process, in which the execution sequence of each CCW 801 has own meaning. In order to perform one processing operation or job in the disk array apparatus 900, the host 901 usually issues a series of CCWs 801 as a CCW chain 802 and makes the DKC 902 sequentially process each CCW 805. The CCW 801 is received by the channel between the host 901 and the DKC 902. Especially, the CCW 801 is a CW issued from the host 901 to the DKC 902. As the CCW chain 804, for example, there is a CCW chain for write control to the disk drive 131 as a control command for input/output data. An example of CCW chain is described in the above-described Japanese Patent Application Laid-Open Publication No. 2001-125866.

The table of FIG. 9 includes each item of a number (#) 201, an address 202, a command code 203, a chain (flag) 204, a parameter 205, and a command 206. The right hand of the table indicates the branch and end of processes. The number 201 of the far left column is a number assigned for descriptive purposes to identify each CCW 801 and control step and it is not required in actually transfer processing. One CCW chain 802 including the conditional branch is comprised of each CCW 801 indicated by the number #1-#11 in the present embodiment. The address 202 stores a command (CCW). The command code 203 identifies the command. The chain 204 is a flag to indicate a presence or absence of a chain connecting the current command to the next command. The parameter 205 is a command parameter. The command 206 is a corresponding command name.

In the CCW chain 802 in the host 901 of this example, "TEST MEM" command of a command code "8B" is stored in an address X00 of #1. The parameter is "1001 0000 0002 0000 01" (hexadecimal notation) and a chain exists. "Tic" command of a command code "08" is stored in an address X08 of #2. The parameter is "0000 0040" and a chain exists. "ALW CRS" command of a command code "83" is stored in an address X40 of #9. The parameter is "52" and a chain does not exist.

The CCW chain 802 is processed by the following procedure in this example. When performing the CCW chain 802 between the DKC 902 and the host 901, the host 901 issues the CCW 801 in numerical order fundamentally. The CCW chain is ended by performing "Program end" command of #8. When the CCW chain 802 does not include the conditional branch, it can be performed in numerical order. Therefore, the host 901 can sequentially transfer the CCW chain 802 as the frame for each CCW 803 to the DKC 902 through the path 104. However, when the CCW chain 802 includes the conditional branch as shown in FIG. 9, the host 901 determines the next CCW to be branched by a part of commands according to the response status from the DKC 902.

In this example, "TEST MEM" command of #1 is a command whose parameter includes the description of the condition to make the DKC 902 determine the condition and return the status of the result as a response. "Tic" command of #2 in this example is a jump instruction of a program address and the command is not transmitted to the DKC 902. The host 901 updates the program counter such that the control is sifted to the address of the jumping destination designated by the parameter of the "Tic" command in accordance with the response status representing the determination result of the last "TEST MEM" command in the DKC 902. Alternatively, the host 901 ignores the command (skip) and shifts to the CCW in the next step.

Thus, the host 901 controls by the IP 111 and CH 113 the proceeding of issuing, transferring, performing and so on of a plurality of CCWs 801 constituting the CCW chain 802. The DKC 902 processes the command of each CCW by the CP 123 or so.

Figure 10A:
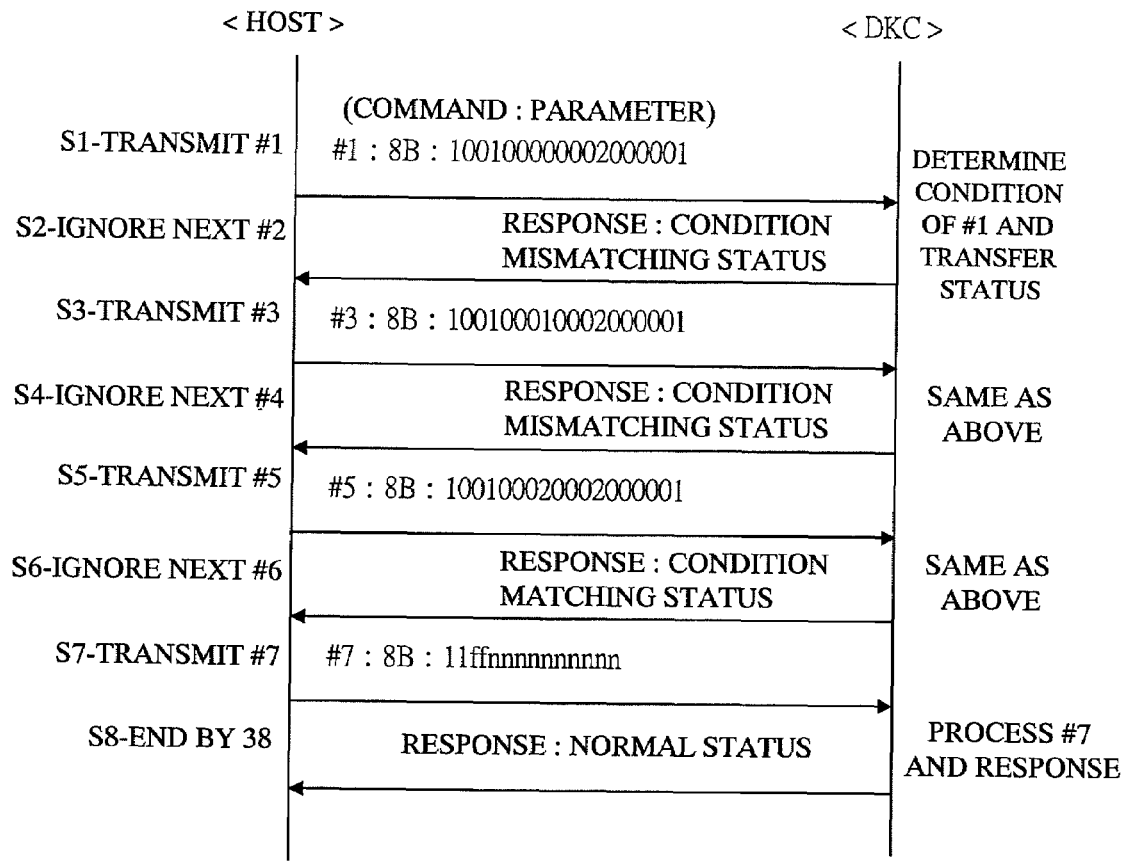
FIG. 10A is a sequence diagram representing processing of the CCW chain between the host and the DKC in a configuration example of the conventional data processing system.
Figure 10B:
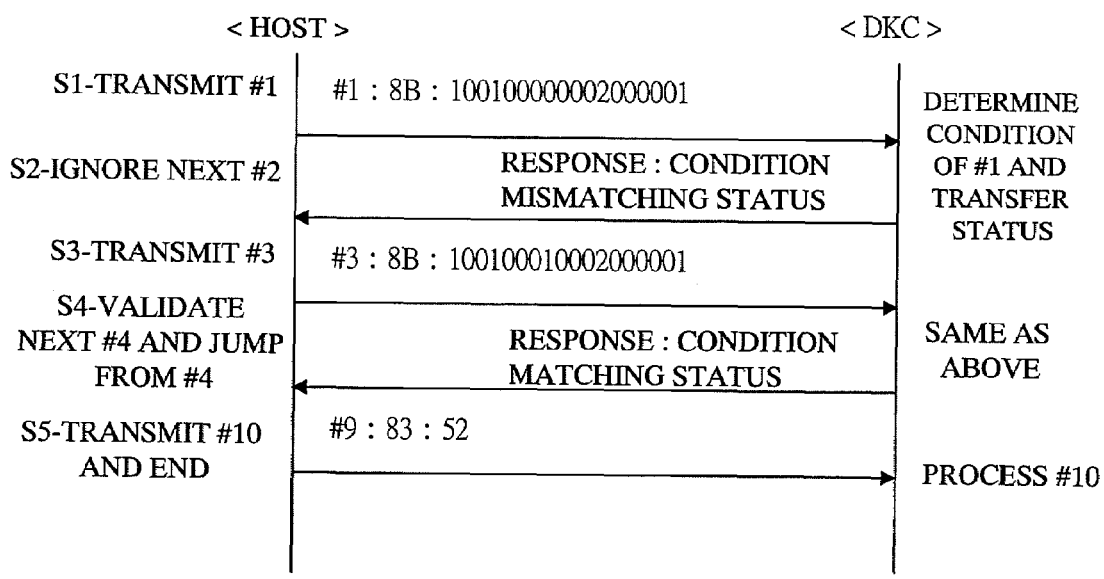
FIG. 10B is a diagram representing processing of the CCW chain between the host and the DKC in a configuration example of the conventional data processing system.

FIGS. 10A and 10B are a sequence diagrams representing the process between the host 901 and the DKC 902. FIG. 10A represents an example when a jump by "Tic" command does not occur in the process of the CCW chain 802. FIG. 10B represents an example when a jump by "Tic" command occurs in the process of the CCW chain 802.

The host 901 issues the CCW ("TEST MEM" command) of #1 and transmits it to the DKC 902 in a step S1 of FIG. 10A. The frame 803 of the CCW transmitted in the #1 includes a command code "8B" and a parameter "1001 0000 0002 0000 01". The DKC 902 receives the CCW of the #1 and determines the condition such as a search processing according to the condition set in its parameter. Then the DKC 902 transmits the status of the determination result as a response to the host 901. The S2 represents that it is determined that the search condition is mismatched and a condition mismatching status as the response status is transmitted to the host 901.

After transmitting the CCW of the #1, the host 901 proceeds the program address for two steps from the #1. And the CCW ("Tic" command) of the next #2 is ignored i.e. skipped to proceed to the next step (#3). Then, the host 901 issues the CCW of #3 in which the conditional value is changed from #1 and transmits the CCW of #3 to the DKC 902 in a step S3. Alternatively, the S2 also represents that it is determined that the search condition is mismatched and that a condition mismatching status is returned to the host 901. Thus the CCW of the next #4 is ignored in a step S4 and a CCW of #5 in which the conditional value is changed is issued and transmitted in a step 5. While, a step S6 represents that the DKC 902 determines that the search condition is mismatched and that a condition mismatching status is returned to the host 901. The host 901 ignores the CCW ("Tic" command) of the next #6 responsive to the receipt of the condition matching status, and issues and transmits the CCW ("T&S" command) of #7 in a step S7. When the CCW is normally processed in the DKC 902 and then the normal status is returned to the host 901, the host 901 ends a sequence of processes of the CCW chain 802 by the CCW "Program end" of the next #8 without chaining to the next.

Steps S1, S2 and S3 of FIG. 10B are same as those of FIG. 10A. S4 represents that determining the condition according to the condition set to the parameter of the CCW of #3, and then the DKC 902 transmits a condition matching status to the host 901.

After transmitting the CCW of #3, the host 901 progresses the program address for one step from #3 upon receipt of the condition matching status so as to make available the next CCW ("Tic" command) of #4 and perform it. The jumping destination designated by the parameter of the "Tic" command of #4 is the address of the CCW ("ALW CRS" command) of #10. Accordingly, the host 902 jumps to the address of #10 to be jumping destination of the process and sifts the control. Then the host 902 issues and transmits the CCW ("ALW CRS" command) of #10 to the DKC 902 in a step S5. And the CCW process of #10 is executed in the DKC 902 to end the process of the CCW chain 802.

In this example, when the system intends to perform the CCW chain 802 and a plurality of CCWs 801 including branches of processes according to the state and processing result in the DKC 902 as in the case including "Tic" command, the sequence of progress of CCWs of the CCW chain 802 in the host 901 is changed according to the response status from the DKC 902. Therefore, the host 901 can not collectively transfer the CCW chain 802 to the DKC 902 through the path 104. That is, a time for waiting to receive the response status from the DKC 902 is required and a temporal synchronous processing between the host 901 and the DKC 902 by interlocking is required. Therefore the process performance can not be improved in this system.

<Data Processing System>

FIG. 1 is a block diagram represents the configuration of the data processing system of an embodiment according to the present invention. The hardware configuration is the same as that of FIG. 8. The present system is a mainframe data processing system in which a mainframe host 101 and a disk array apparatus 100 are communicatively connected. The system comprises the host 101 and the disk array apparatus 100. The host 101 is connected to a DKC 102 through a path 104. The DKC 102 and a DKU (disk unit) 103 are connected through a path 105 in the disk array apparatus 100. The DKU 103 includes a plurality of disk drives (DKs) 131. The DKC 102 can control a group of DKs 131 in RAID format.

Programs such as an OS are operated on the host 101. The host 101 issues and transmits the command as CCW to the DKC 102 to make the DKC 102 process the command, and performs various data processing such as data input/output and the other controls to the storage volume of the disk array apparatus 100. The host 101 can access the DKC 102 by Read/Write command through the path 104 of the channel to the DKC 102 to read/write data to the storage volume. A storage volume or a device to store data is located on the DK 131 in the DKU 103 and managed with the ID (identifier).

The host 101 especially has a function to manage a CCW chain 402 comprised of a plurality of CCWs 401 to control the progress of the process of each CCW 401. The host 101 controls a data processing by executing programs and hardware logic, issues a plurality of CCWs 401, transmits the CCWs 401 and the CCW chain 402 to the DKC 101, receives a response status and control the progress of the CCW chain 402. In this embodiment, the controlling of the progress of the CCW 401 and the CCW chain 402 is achieved by encoding a code 403. The host 101 performs an encoding by executing an encode program 115 and correspondingly, the DKC 102 performs a decoding by executing a decode program 126.

Communication is performed through the path 104 between the host 101 and the DKC 102 according to a predetermined I/F. The I/F is a mainframe protocol such as FICON (Fibre Communication)(registered trademark) and ESCON (Enterprise System Connection) (registered trademark). The path 104 of the channel is constructed by the wiring such as a communication cable and the necessary electric parts such as a connector. The port of the communication I/F in the host 101 is referred to as a channel. The PORT 121 of the DKC 102 has an input/output processing function corresponding to the channel of the host 101. A channel as the path to transfer data and control information is located between the host 101 and the DKC 102 in the form of direct connection or network connection.

<Host Computer>

The host 101 comprises an arithmetic processing unit (IP) 111, a main storage unit (MS) 112☐ an input/output channel unit (CH) 113 and a system controller (SC) 114 as shown in FIG. 1.

The IP 111 executes programs of the host 101 such as an OS and an application, issues the CCW 401 and the CCW chain 402 and stores them in a memory area such as the MS 112.

The MS 112 stores various data and information such as programs, input/output data, the command such as the CCW 401 and the created code 403. Those of data and information may be stored in the memory in the CH 113.

The CH 113 performs communication processing with the external disk array apparatus 100 through the input/output channel (referred to as a port). The CH 113 is referred to as a host bus adapter (HBA). The CH 113 transmits the CCWs in the form of a frame through the path 104 to the PORT 121 of the DKC 102 and receives the response frame. The CH 113 especially transmits the code 403 including a plurality of CCWs 405 as a frame 404 for batch-processing of the CCW and receives the response frame from the PORT 121. The CH 113 performs an encoding as a characteristic process by executing the encode program 115. The CH 113 encodes a plurality of CCWs 401 stored in the MS 112 by executing the encode program 115 to create the code 403.

The SC 114 controls the system and transfers data between each unit of the host 101.

<Disk Control Unit>

The DKC 102 comprises an input/output port unit (PORT) 121, a cache memory unit (CM) 122, a control processor unit (CP) 123, a data transfer control unit (DTC) 124, a shared memory unit (SM) 125 and a decode program 126 as shown in FIG. 1. The DKC 102 includes a function of storage control for data input/output to the storage volume of the DKU 103 and RAID control. The DKC 102 and especially includes a function to process the command corresponding to each CCW. The DKC 102 executes data reads/writes to the storage volume of the DKU 103 according to the command from the host 101. The command processing function includes the process corresponding to the CCW 405 added by encoding in the host 101.

The PORT 121 performs communication processing with the external host 101 at the input/output port. The PORT 121 receives CCWs in the form of a frame through the path 104 to the CH 113 and transmits the response frame. The PORT 121 especially receives the frame 404 for batch processing of CCWs, transmits the response frame and decodes the code 403 by executing the decode program 126.

The CM 122 is a memory to cache data in the DKC 102. The SM 125 is a memory to store control information and management information in the DKC 102. The DKC 102 performs data processing while the PORT 121 and the CP 123 appropriately store data and information on the CM 122 and the SM 125 through the DTC 124 to process data in.

The CP 123 performs data processing and data controlling including CCW processing in the DKC 102. The process and control by the CP 123 is equivalent to storage control function. The CP 123 includes at least a microprocessor and processes the command corresponding to each CCW 405 obtained by decoding.

The DTC 124 controls data transfer between each unit in the DKC 102. For example, the DKC 124 is configured by a connection network such as switch for switching and controlling data transfer; and a DMA control circuit that performs DMA data transfer processing.

The PORT 121 may be a channel control unit (CHA) to perform channel I/F processing to the external device. The CP 123 may be configured by interconnecting each functional unit, such as the CHA and a disk control unit (DKA) to perform disk I/F processing. The CHA controls communication with one or more external devices through a plurality of ports. The DKA controls data input/output to the DK 131 in the DKU 103 through the path 105.

The DKC 102 may be configured by interconnecting a plurality of control packages corresponding to the functional unit such as the CHA. Further, a SVP (supervisor unit) 196 including a processor for maintenance processing is connected to the DKC 102 in the disk array apparatus 100. An operator can operate the SVP 196 to perform various processes involving maintenance of the disk array apparatus 100 by the SVP 196. The SVP 196 maintains configuration information and fault information regarding the disk array apparatus 100. Additionally, the SVP 196 may install programs to be executed on each unit in the DKC 102 and set the configuration of the storage volume.

<Hardware of Disk Array Apparatus>

Figure 2:
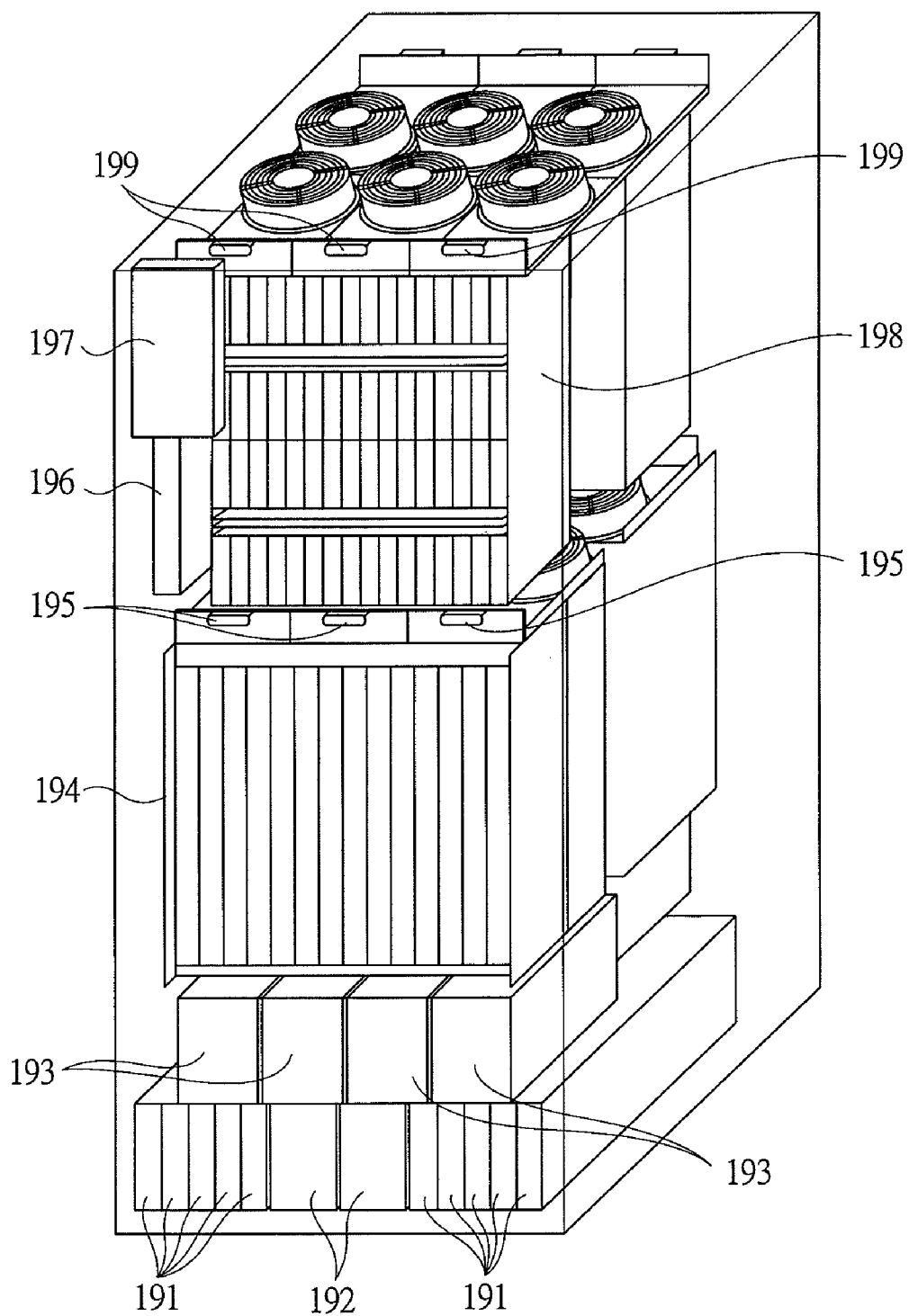
FIG. 2 is a perspective view representing the external appearance of the entire hardware of the disk array apparatus of an embodiment according to the present invention.

FIG. 2 is a perspective view representing the external appearance of the entire hardware of the disk array apparatus 100. The disk array apparatus 100 is constructed by a base chassis and an expansion chassis. The front of the base chassis is transparently viewed from upper right direction in FIG. 2, which represents the placement of each unit in the base chassis. The base chassis is the minimum constitutional unit and includes storage control function taken on the DKC 102 and storage function taken on the DK 131. The expansion chassis is the option unit and includes storage function. Each chassis is communicatively connected to each other through the communication cable.

A plurality of batteries 191, a plurality of AC boxes 192, a plurality of AC-DC power sources 193, a DKC box 194, a plurality of fans 195, a SVP 196, a panel 197, a DKU box 198 and a plurality of fans 199 are provided from the bottom in the base chassis.

The batteries 191 are connected to the AC-DC power sources 193 to serve as a backup power at the power failure. The AC boxes 192 are junctions to connect an input AC power source and connected to the AC-DC power sources 193. The AC-DC power sources 193 perform AC/DC conversion of the input AC power to supply the DC power to each unit in the DKC 102.

The DKC box 194 has structures such as a plurality of slots being capable of mounting control packages constituting the DKC 102. The control packages are releasably connected through each slot and can be replaced per units of a control package. The control package mainly includes a board on which each functional unit such as the host I/F is packaged and is integrally modularized to additionally have electrical/mechanical mechanism such as a canister.

The SVP 196 is formed of a laptop computer. The SVP 196 is usually received into the chassis and taken out to the front in use. In the panel 197, a switch for the basic operation of the disk array apparatus 100 and an indicator to indicate various information are provided. The plurality of fans 195 and 199 provided in the chassis transmit air to each unit in the chassis and each unit is air-cooled. A plurality of storage units such as DKs 131 constituting the DKU 300 are removably connected to the DKU box 198, respectively.

<Data Processing Method>

As the data processing method of the data processing system according to the present embodiment, a processing of the CCW chain 402 is summarized below. Data flow between each unit is represented in FIG. 1. The host 101 issues a plurality of CCWs 401 and makes the disk array apparatus 100 perform processing operation and job according to the CCW chain 402 composed of a group of CCWs 401. The host 101 can collectively transfer the CCW chain 402 which are sequentially performed in the DKC 102 to the DKC 102 through the channel between the host 101 and the DKC 102 and each CCW 401 is sequentially processed in the DKC 102. At this time, in order to make the DKC 102 sequentially process the command, the host 101 encodes a plurality of CCW 401 to the code 403 in the form of one data stream to collectively transfer a frame 404 of the code 403 through the channel. Then the code 403 is decoded and executed in the DKC 102 so that the plurality of CCW 401 can be collectively processed.

The host 101 creates the CCW chain 402 on a region of MS 112. As the CCW chain 402, for example, a CCW chain 802 as shown in FIG. 9 including the conditional branch according to the state and the processing result of the DKC 101 is created. A part of CCW 801 of the CCW chain 802 includes the description of the search condition for the DKC 102. When the CCW chain 802 including the conditional branch will be performed, the host 101 encodes the CCWs in the form of the code 403.

When the CCW 402 chain does not include the conditional branch, the CH 113 can sequentially transfer the CCW chain in the form of each CCW frame 803 through the path 104 of the channel between the DKC 102 and the PORT 121 as in the conventional process.

When performing the CCW chain 802 including the conditional branch according to the state and the processing result in the DKC 102, the host 101 encodes a plurality of CCWs 401 to create one code 403 including the description of processing the conditional branch in the form of a CCW 405. Then the host 101 transmits the created code 403 as the frame 404 of the command for batch processing to the DKC 102 through the path 104 of the channel.

The DKC 102 takes out the code 403 from the frame 404 that is received from the host 101. Then the DKC 102 sequentially decodes the code 403 from the beginning and CCW-processes each CCW 405 which is obtained by the decoding. In order to control from the host 101 side the progress of CCW-processing in the DKC 102, the host 101 uses the CCW 405, which is different from the original CCW 401, in the code 403 created by the encoding. Thereby the CCW chain included in the code 403 is different from the original CCW chain 402.

When the controlling description of the conditional branch is particularly included during the processing of the code 403, the DKC 102 branches the CCW processing according to the description. For example, the DKC 102 determines the condition according to the description of the condition in the parameter of the decoded command and performs the command to be the jumping destination based on the processing result. Then the DKC 102 ends the process by a predetermined CCW 405 according to the description. The DKC 102 returns status information corresponding to the end state and position of the process to the host 101 as a response according to the description. For example, the status information is described in the parameter of the CCW included in the code 403. The host 101 receives status information of the response from the DKC 102. Due to this, the host 101 recognizes the end of the processing of a plurality of CCW 401 corresponding to one code 403.

The host 101 determines the CCW that will be issued subsequently based on the recognition of the end of process. When receiving an abnormal (error) status from the DKC 102 indicating that the process can not normally ended in batch processing of a plurality of CCW 401, the host 101 performs an error processing corresponding to the end state and position of the process indicated by the return code (RC) of the response status and performs an recovery processing for the CCW at end position.

The process of the CCW chain 402 according to the present embodiment will be described in detail below. In the host 101, an IP 111 executing the programs issues the CCW 401 and the CCW chains 402 and stores them in the region of the MS 112. For example, the CCW chain 802 as shown in FIG. 9 is issued. The CH 113 encodes the CCW chain 802 by executing the encode program 115 to create one code 403. The CH 113 transmits the created code 403 in the form of the frame 404 as the batch processing command to the PORT 121 through the path 104 of the channel to the PORT 121 of the DKC 102 by executing a channel program. The PORT 121 of the DKC 102 takes out the code 403 from the received frame 404 and transfers the code 403 to the CP 123 through the DTC 124. The CP 123 in the DKC 102 decodes the code 403 by executing the decode program 126 and performs the process corresponding to each CCW 405 obtained by the decoding in accordance with the controlling description of the conditional branch. Ending the process of the code 403 corresponding to the CCW chain 802, the DKC 102 transmits the response status including a RC representing the processing result from the PORT 121 to the CH 113. The host 101 refers to the RC included in the response status received by the CH 113 and recognizes the processing result of the CCW chain 802. The host 101 recognizes the end state of the process based on the response status and reports to the IP 111. The host 101 can specify the spot at which the error occurs based on the RC and determine the next process.

As thus discussed above, the host 101 creates the code 403 including the controlling description of the conditional branch and transfers the code 403 to the DKC 102 for batch process while the IP 111 and the CH 113 control to issue, transfer and perform a plurality of CCWs 401 constituting the CCW chain 402.

<Code and CCW Format>

Figure 3:
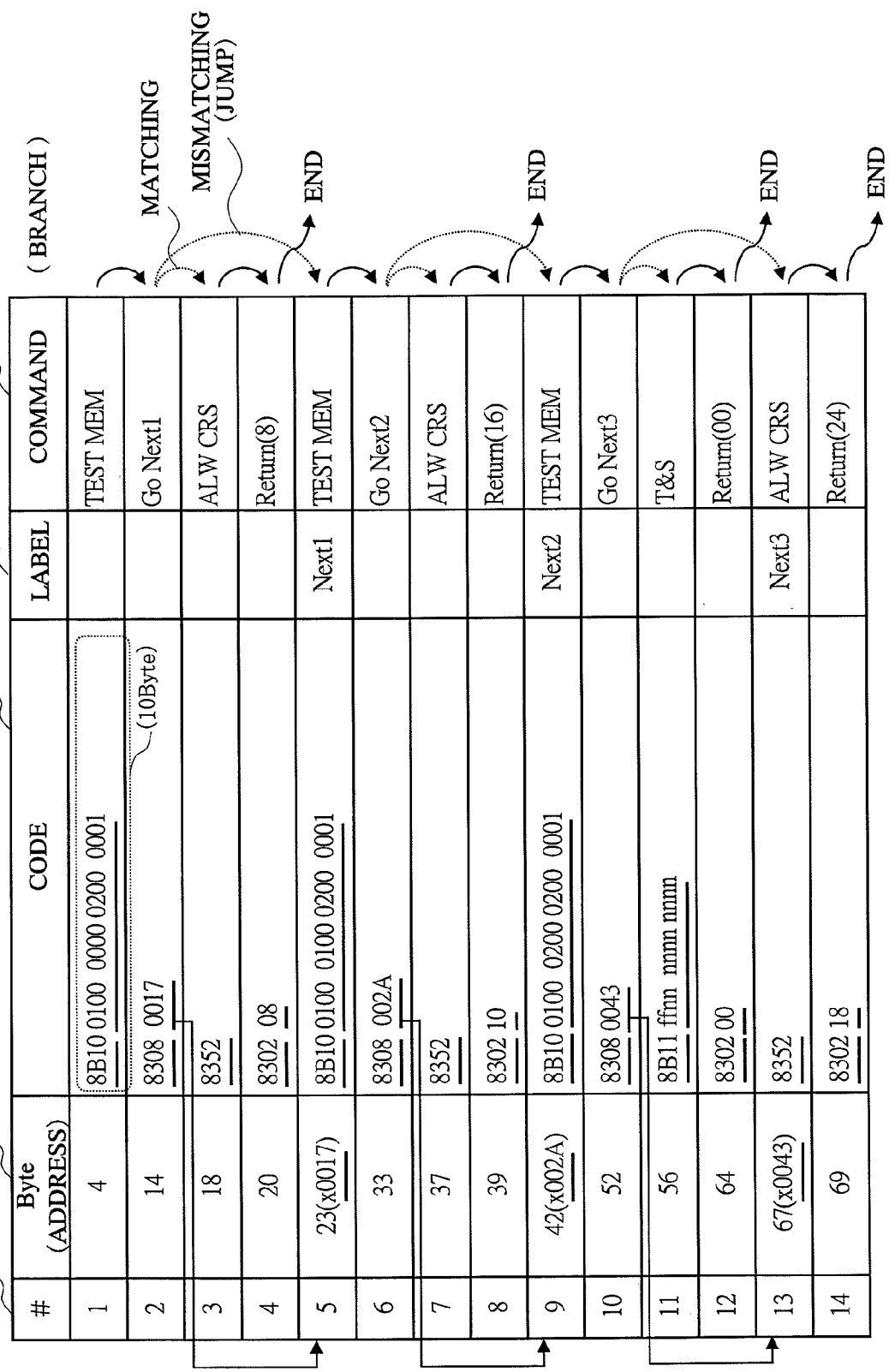
FIG. 3 is a table representing an example of creation of codes in the data processing system of an embodiment according to the present invention.

FIG. 3 represents an example of forming the code 403 in the present data processing system. The table is comprised of items including number 301, byte (address) 302, code 303, label 304, and command (CCW) 305 from the left column. The data stream created by encoding in the host 101 is referred to as the code 403 in the present embodiment. The arrows on the right side in the table indicate the execution sequence of each command processing, each jump and the end state. Incidentally, a CCW is synonymous with a command.

The number 301 of the leftmost column is assigned for descriptive purposes for identifying the CCW in each column. The number 301 corresponds to one CCW and one step of processing/controlling but it is not necessary in the code 403 during being transferred. In the present embodiment, data is organized by a plurality of CCWs 401 as the base of the code 403. The data is to be one batch processing unit which is comprised of each CCW indicated by the numbers #1-#14. The address 302 represents an address of the memory area in which the CCW is stored. The letter "x" in the parenthesis is hexadecimal notation of the address. The code 303 is a data stream including command codes and parameters, and is created by encoding the original CCW 401. One code 403 is formed by connecting the items of the code 303. The label 304 is a name for identifying a jumping destination. The command 305 is a command (CCW) name corresponding to the CCW and the code 303 in the row. Incidentally, the code 303 includes spaces in an easy-to-understand format but the spaces are not necessary in the actual code 403.

In the present embodiment, #1, #5 and #9 correspond to "TEST MEM" command. #11 corresponds to "T&S" command. #2, #6 and #10 correspond to "Go Next" command. #3, #7 and #13 correspond to "ALW CRS" command. #4, #8, #12 and #14 correspond to "Return" command. The label of #5 is "Next1" that will be the jumping destination of the "Go Next" command of #2. "Next2" of #9 is the jumping destination of #6, and "Next3" of #13 is the jumping destination of #10 in the same way.

The content of the CCW 401 and the 405 used as an example in the present embodiment and the corresponding process will be described. Firstly, "TEST MEM" (test memory) command has the command code "8B" and the subsequent sub-code is "10" as shown in FIG. 3. The "TEST MEM" command has a function to compare the memory area in the DKC 102 with the parameter of the command to check whether it is matched with the condition. The parameter is a conditional value for the determination. The DKC 102 determines the code portion and CCW to be performed subsequently based on the check result (matching with the condition or not) and according to the controlling description of the conditional branch.

According to the "TEST MEM" command, the DKC 102 compares the parameter value of the command "0100 0000 0200 0001" with the value of a predetermined memory area in the DKC 102 (search processing). When the parameter value and the value of the memory area are matched, the DKC 102 returns a search condition matching status, alternatively those are not matched, the DKC 102 returns a search condition mismatching status.

"T&S" (test and set) command has the command code "8B" and the subsequent sub-code is "11". The "T&S" command as well as the "TEST MEM" command has a function to compare the memory area in the DKC 102 with the parameter of the command to check whether it is matched with the condition. If the condition is matched, the parameter value is written to the memory area of the DKC 102.

"Return" command has the command code "83" and the subsequent sub-code is "02". The "Return" command has a function to normally end when the parameter value is "00" and add the parameter value to the RC representing the end state of the process and report as a response status to the host 101 when the parameter value is other than "00".

"Go Next" command has the command code "83" and the subsequent sub-code is "08". The "Go Next" command has a function to branch the process based on the processing result of immediately preceding TEST commands (the "TEST MEM" command and the "T&S" command), i.e. jump instruction. The conditional branch is controlled as follows. The process is sifted to the address of the next step when the condition is matched in the immediately preceding command, i.e. at the condition matching status. Alternatively the process is jumped to the address designated by the parameter of the command when the condition is not matched, i.e. at the condition mismatching status. The encode program 115 encodes "Tic" command to convert into "Go Next" command that is a code portion described with the control of the conditional branch according to the state and the processing result in the DKC 102.

"ALW CRS" command has the command code "83" and the subsequent sub-code is "52". The "ALW CRS" command has a function to change the internal state of the DKC 102.

The content of the code 403 according to the present embodiment is described with reference to FIG. 3. In the CCW of #1, the code portion (303) of "TEST MEM" command with the command code "8B" and the sub-code "10" is stored in the memory area at the address "4". The code 303 is "8B10 0100 0000 0200 0001" (hexadecimal notation). Where, "8B" is 1 byte and the entire code 303 is 10 bytes. The parameter "0100 0000 0200 0001" of the command will be a conditional value for the test.

In the CCW of #2, the code portion of "Go Next1" command with the command code "83" and the sub-code "08" is stored in the memory area at the address "14". The code 303 is "8308 0017" and its size is 4 bytes. The parameter of the command is "0017" and indicates the address (hexadecimal notation) corresponding to the label "Next1" to be jumping destination. In the present command processing, when the response status from the immediately preceding command #1 is the condition matching status, the process is jumped to the label "Next1" to be jumping destination. Alternatively, when it is the condition mismatching status, the process is shift to the address of the next #3.

In the CCW of #3, the code portion of "ALW CRS" command with the command code "83" and the sub-code "52" is stored in the memory area at the address "18". The command does not have any parameter, the code 303 is "8352" and its size is 2 bytes.

In the CCW of #4, the code portion of "Return (8)" command with the command code "83" and the sub-code "02" is stored in the memory area at the address "20". The parameter of the command is "08", the code 303 is "8302 08" and its size is 3 bytes. The parameter "08" indicates the value "08" (decimal notation) to be the return code (RC). Performing the command, the DKC 102 returns the response status including the RC "08" to the host 101 and ends the process in the DKC 102.

Next, in the CCW of #5, the code portion of "TEST MEM" command is stored in the memory area at the address "23 (x0017)" as in the #1. The label 304 of the command is "Next1". The command is used to perform a test with the value different from the parameter value of the command of #1. Hereinafter the code portion of each CCW is stored in the memory area of #5-#8 as well as the #1-#4. In the CCW of #6, the code portion of "Go Next2" command is stored in the memory area at the address "33". The parameter of the command is "002A". The command indicates the address corresponding to the label "Next2" to be the jumping destination. In the CCW of #7, the code portion of "ALW CRS" command is stored in the memory area at the address "37". In the CCW of #8, the code portion of "Return (16)" command is stored in the memory area at the address "39". The parameter of the command is "10" and it indicates RC "16".

Next, in the CCW of #9, the code portion of "TEST MEM" command is stored in the memory area at the address "42 (x002A)". The label 304 of the command is "Next2". The command is used to perform a test with the value different from the parameter value of the command of #1 and #5. Next, in the CCW of #10, the code portion of "Go Next3" command is stored in the memory area at the address "52". The parameter of the command is "0043". The command indicates the address corresponding to the label "Next3" to be a jumping destination.

Next, in the CCW of #11, the code portion of "T&S" command with the command code "8B" and the sub-code "11" is stored in the memory area at the address "56". The parameter of the command is "ffnn nnnn nnnn" and indicates the value to be set to the memory area of the DKC 102. The code 303 of the command is "8B11 ffnn nnnn nnnn" and its size is 8 bytes.

Next, in the CCW of #12, the code portion of "Return (00)" command is stored in the memory area at the address "64". The parameter of the command is "00" and it indicates RC "00". Performing the command, the DKC 102 returns a normal status including the RC "00" to the host 101 and ends the process.

Next, in the CCW of #13, the code portion of "ALW CRS" command is stored in the memory area at the address "67 (x0043)". The command does not have any parameter. The code 303 is "8352" and its size is 2 bytes.

Next, in the CCW of #14, the code portion of "Return (24)" command is stored in the memory area at the address "69". The label 304 of the command is "Next3". The parameter of the command is "18" which indicates RC "24".

<Frame of Command>

Figure 4:
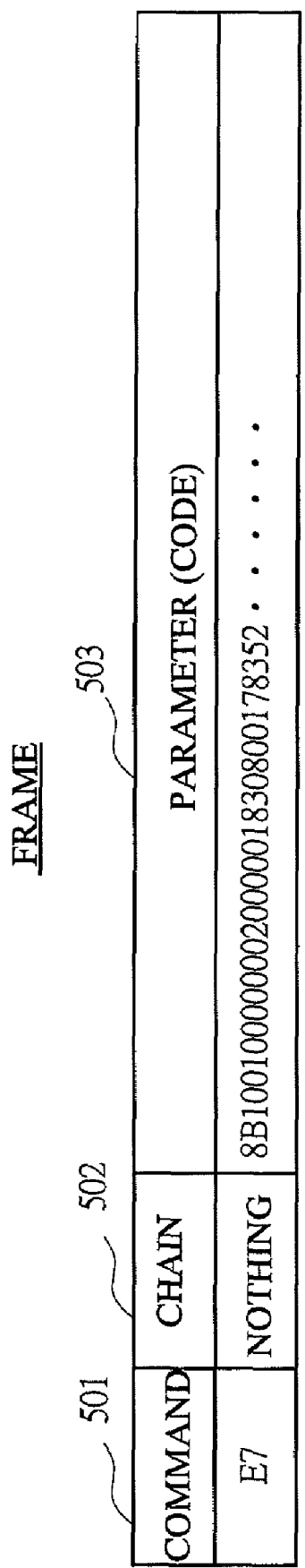
FIG. 4 is an explanatory view representing the frame format of a new command prepared for batch processing of CCWs in the data processing system of an embodiment according to the present invention.

FIG. 4 represents the format of the frame 404 of a new command prepared for batch processing of CCWs. The command is used to transfer the data (code 403) in the form of one frame when a plurality of CCWs are transferred and batch-processed. The code 403 is the parameter of the command for the batch processing. The command can be used for both of the cases that a plurality of CCWs without the conditional branch are collectively transferred, and that the CCWs including the conditional branch are collectively transferred.

The frame 404 of the command includes each field for a command code 501 representing the command, a chain 502 being a flag representing a presence or absence of chain and a parameter (content data) 503 of the command. The command code 501 is, for example, "E7" in the frame 404. The chain 502 is, for example, set to "Nothing". The code 403 created by the above encode process is set as the parameter 503 (content data).

During performing a batch processing, the CCWs 401 to be batched are encoded by the CH 113 so that the code 403 is created in the host 101. In the CH 113, the created code 403 is used for the parameter 503 of the frame 404 with command code "E7". The CH adds the chain 502 and information such as source/destination addresses to the parameter 503 to create the frame 404. Then CH 113 transmits the frame 404 to the PORT 121.

<Data Processing Sequence>

Figure 5:
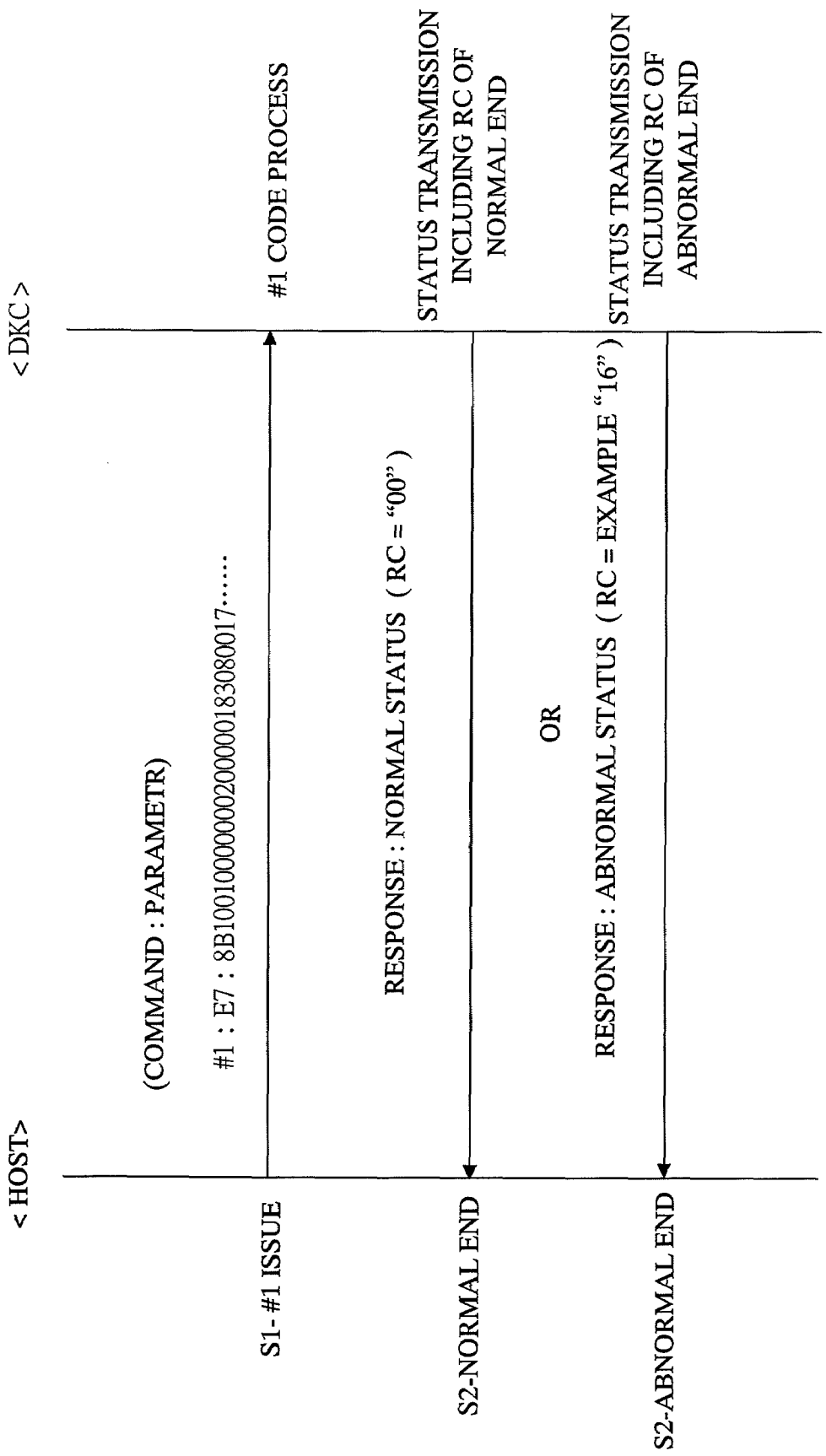
FIG. 5 is a sequence diagram of the data processing when the batch processing of CCWs between the host and the DKC in the data processing system of an embodiment according to the present invention.

FIG. 5 represents a sequence of the data processing when the CCWs 401 are batch-processed between the host 101 and the DKC 102. The CH 113 of the host 101 transmits the frame 404 of the command created for batch processing to the PORT 121 of the DKC 102 in step S1. The DKC 102 receives the frame 404 at the PORT 121 and takes out the code 403. Then, the PORT 121 sequentially decodes the code portion of the code 403. The PORT 121 determines each CCW 405 obtained by the decoding and transmits them to the CP 123, for example, through the DTC 124. The CP 123 executes CCW process for each CCW 405. In step S2 or S3, the PORT 121 transmits to the CH 113 the status information as response status according to the result of CCW processing. The status information includes the information corresponding to the normal end/abnormal end of the process and the information including the RC corresponding to the end state of the process according to the conditional branch. The S2 represents the case that the normal status including RC "00" is returned when the process is normally ended. The S3 represents the case that the abnormal status including the RC corresponding to the end state and position is returned when the process is abnormally ended. Receiving the response status from the DKC 102, the host 101 can recognize the end state and position of the process and determine the next process.

The procedure of processing the code 403 will be described below in detail. Hereinafter the code portion in each row of the number 301 in the code 403 is referred to as a command row. In processing the code 403, the decode program 126 executes the command rows generally in numerical order. At the "Go Next" command, when the status of processing result in the last "TEST MEM" command is matching status, shift to an address of next command row is performed. Alternatively, when the status is mismatching status, jump to the address of the jumping destination indicated by the parameter of the present command is made. While the process is branched, the process of the code 403 is ended by executing any "Return" command and the designated RC is returned.

After performing the command row of #1, the DKC 102 performs the command row of #2. When the status of the processing result of the command row of #1 is a matching status, shift to the command row of #3 is performed without jumping by the #2. Alternatively when the status of the processing result of the command row of #1 is a mismatching status, jump to the designated address (label "Next1") is made according to the execution of #2. When it is the matching status in the #2, the DKC 102 sequentially performs the command rows of #3 and #4 and returns RC "8" to the host 101. Then the process is ended. When it is the mismatching status in the #2, the DKC 102 performs the same processes in #5-#8. When it is the matching status in #5, the DKC 102 returns RC "16" to the host 101 in #8 and the process is ended.

After performing the command row of #9, the DKC 102 performs the command row of #10. When the status of the processing result of the command row of #9 is a matching status, shift to the command row of #11 is performed without jumping by the #10. Alternatively when the status of the processing result of the command row of #9 is a mismatching status, jump to the designated address (label "Next1") is made according to the execution of #10. When it is the matching status in the #10, the DKC 102 sequentially performs the command rows of #11 and #12 and returns RC "00" to the host 101. Then the process is ended. When it is the mismatching status in the #9, the DKC 102 sequentially performs the command rows of #13 and #14 and returns RC "24" to the host 101. Thus the process is ended.

<Host Processing>

Figure 6:
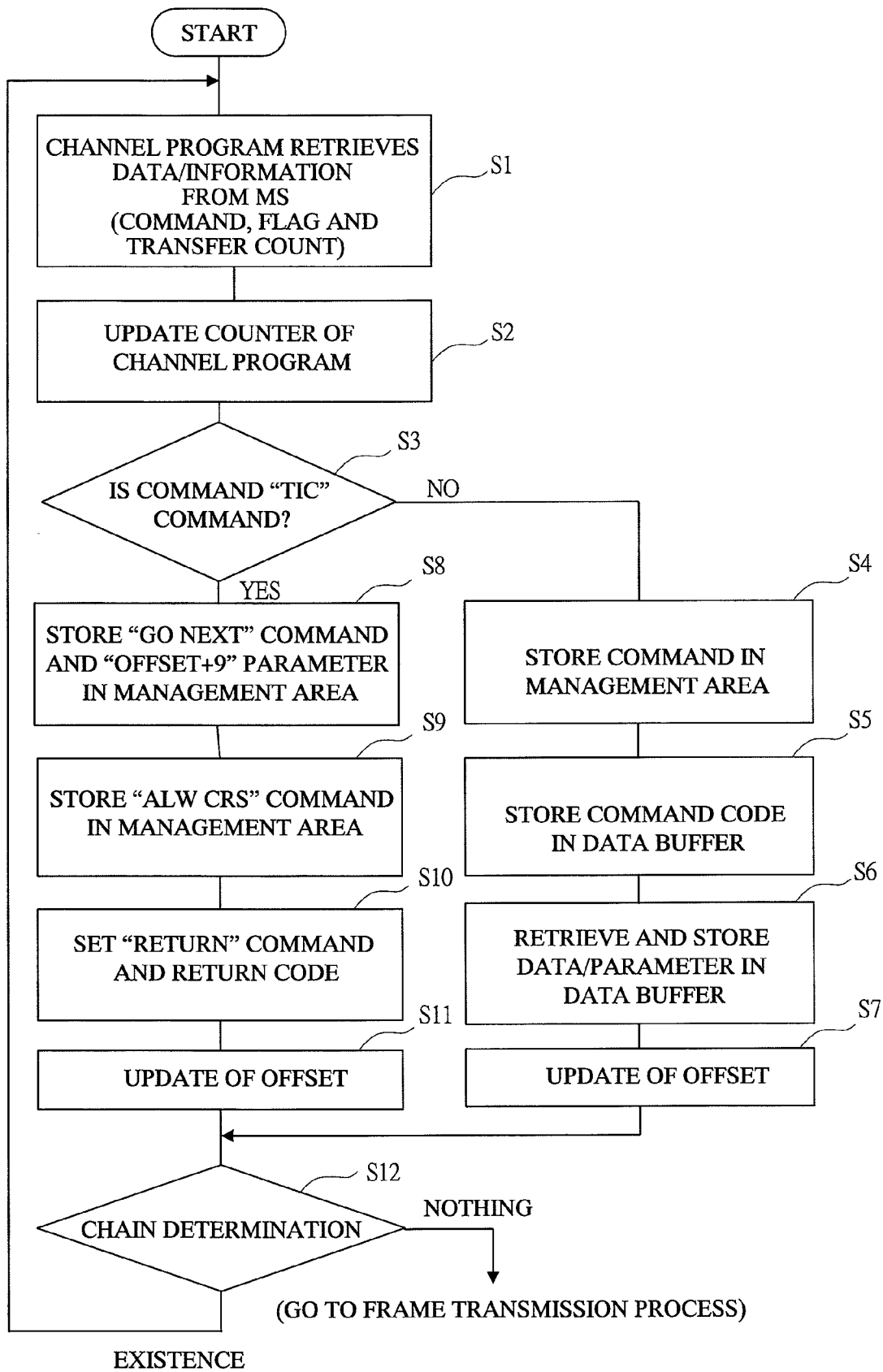
FIG. 6 is a flowchart of encoding by the CH of the host in the data processing system of an embodiment according to the present invention.
Figure 7:
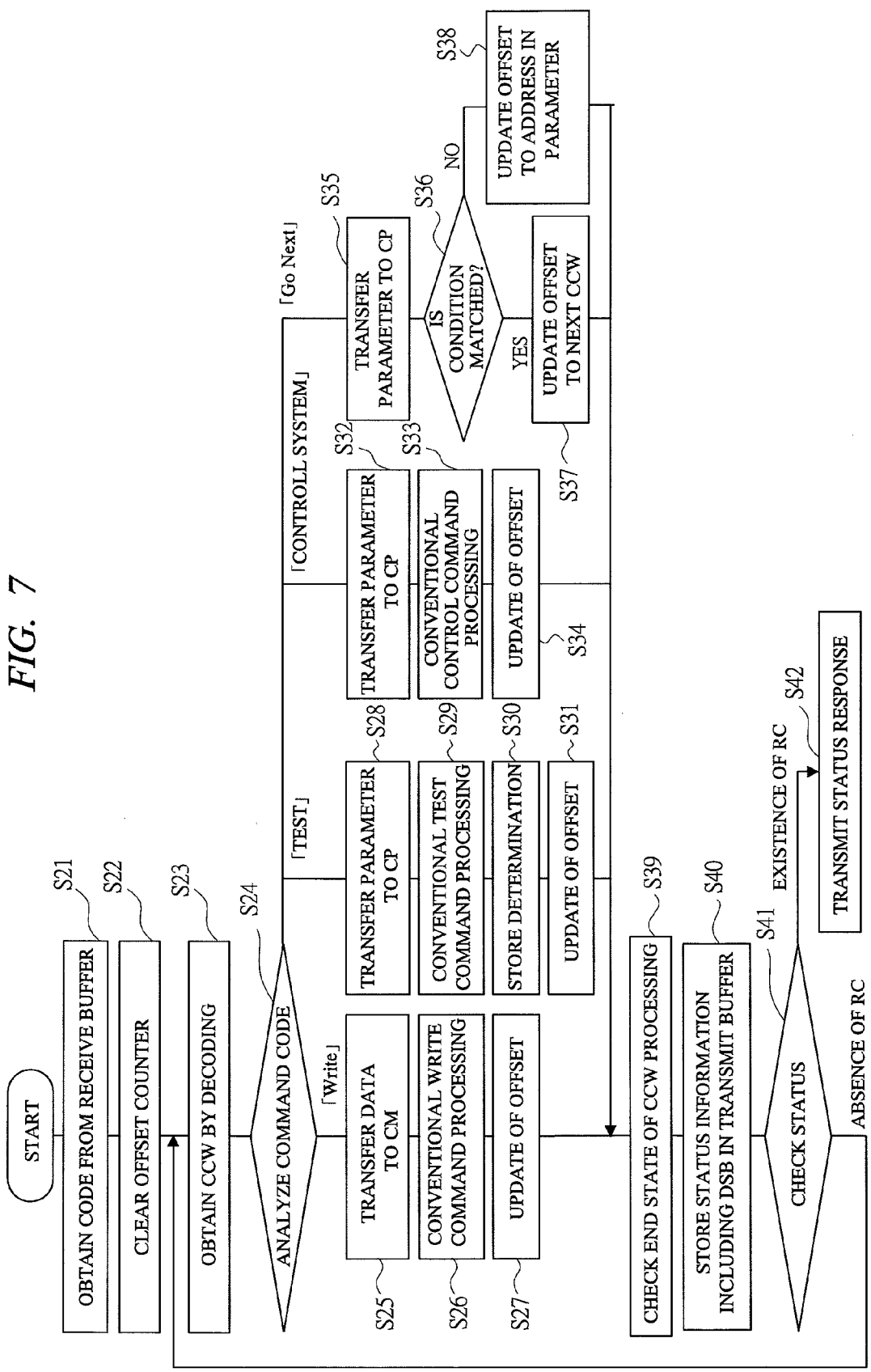
FIG. 7 is a flowchart of decoding by the PORT of the DKC in the data processing system of an embodiment according to the present invention.

Next, the flow of each process in the present system will be described. FIG. 6 is a flowchart of encode process by the CH 113 in the host 101. FIG. 7 is a flowchart of decode process by the PORT 121 in the DKC 102. Particularly, a case that the code 403 of FIG. 3 is created from the CCW chain 802 of FIG. 9 to perform batch process will be described. Incidentally, "offset" in the description means the position of the control step during processing of the code 403 by the program.

As a prerequisite, the IP 111 creates a plurality of CCWs 401 such as CCW chain 402 and stores them in the MS 112 in the host 101. The CH 113 performs the usual channel input/output control processing by executing the channel program and also performs encode process in relation to the batch processing of a plurality of CCWs 401. The CH 113 encodes the plurality of CCWs 401 by executing the encode program 115. The channel program manages command words representing the command to be performed, flag information representing a chain, transfer counts representing the transfer target and addresses representing the position of data and parameter in the memory.

The channel program of the CH 113 retrieves data and information such as a command (CCW 401), a flag, a transfer count from the MS 112 one by one in step S1. Next, the channel program updates the program counter in step 2. Then, the channel program determines whether the retrieved command is a conditional branch command such as the "Tic" command in a step S3.

When the retrieved command is not the "Tic" command in the step S3 (S3—NO), the channel program stores the command in a channel program management area in step S4. Next, the channel program stores the command code of the command in a data buffer for transferring data to the DKC 102 in step S5. Then, the channel program sequentially retrieves the command code and the corresponding data and parameter from the MS 112 and stores them to the data buffer in step S6. Thereby the command and parameter are encoded to the code portion. Next, after completing of the encoding for one command in step S7, the channel program updates the offset. And shift to a step S12 is performed.

When the retrieved command is the "Tic" command in the step S3 (S3—YES), the channel program encodes each command as #2-#4 of FIG. 3 in steps S8-S10. Firstly, in the step 8, the channel program stores the "Go Next" command in the channel program management area with set of the address assigned by adding 9 bytes to the offset as a parameter. The total size of the command created by encoding the "Tic" command is 9 bytes according to the present embodiment. Therefore, that the parameter (jumping destination address) of the command is "offset+9". Next, the channel program stores "ALW CRW" command in the channel program management area in the step S9. Then, the channel program sets "Return" command and its RC in the step S10. Next, after of completing to encode the "Tic" command, the channel program updates the offset. And shift to a step S12 is performed.

The channel program determines whether a chain of the encoded command exists or not in step S12. When the chain to the next command exists, the process flow returns to the step S1 and repeat processing to the next command is performed in the same way. When the chain to the next command does not exist, the code 403 comprised of continuous code portions is completed and then the flow shifts to a transfer processing of the frame of the code 403. The CH 113 provides header information to the code 403 to create the frame 404 for batch processing. And the CH 113 transfers the frame 404 to the PORT 121 according to the conventional frame transfer process control.

In "TEST MEM" command as the first (#1) CCW, the command code "8B" and the parameter ("10010000 . . . ") are brought together into one code portion (code 303) as shown in #1 of FIG. 3 by processing the encode program 115. A parameter for process condition of performance in the DKC 102 is set to the "TEST MEM" command. The next CCW is encoded so as to be brought into one code portion in the same way. The created code portion is added to behind the encoded code portion.

The encode program 115 encodes the "Tic" command of the CCW, which is a jump instruction for the conditional branch according to the state and the processing result in the DKC 102, into the code portion including "Go next" command. The processing of the encode program 115 creates the "Go next" command, the address of jumping destination by the "Go next" command and each CCW of the jumping destination as the code portion in the code 403 in order to control the conditional branch that performs different addresses dependent on whether the condition is matched or not in DKC 102. The encode program 115 calculates which position the address to be performed in case of mismatching in the entire code 403 will be located at, in consideration of the CCW to be performed when the condition is matched. And the encode program 115 adds as a parameter the number of bytes of the address of jumping destination by "Go Next" command.

In the present embodiment, after the "TEST MEM" command including the conditions, the "Go Next" command is described, which "Go Next" is to be performed when the condition is not matched according to the state and the processing result in the DKC 102 by the "TEST MEM" command. And subsequently, the command such as "ALW CRS" to be performed when the condition is matched and to be the other jumping destination is described.

The encode program 115 additionally creates the code portion of "Return" command and its return code (RC) in order to recognize the end state and position of the process corresponding to the entire code 403 with regard to the CCW that is ended in the state of no chain existing.

The host 101 can recognize the end state and position of the command processing in the DKC 102 based on the RC included in the response status that is received from the DKC 102. Based on the received RC, the host 101 determines the address at which the process is ended in the CCW 401 and the CCW chain 402 that are the base of the code 403 and that are stored in MS 112. The host 101 determines any processing operation, which includes, for example, an error processing corresponding to the end state of the abnormal end of the CCW, a recovery processing of the CCW and the next processing when the processing is normally ended. Then the processing operation can be performed.

<DKC Processing>

In FIG. 7, the PORT 121 receives the frame of the CCW 401 and performs the process involving a batch processing of a plurality of CCWs 401. The PORT 121 decodes by decode program 126. The CP 123 processes each CCW 405 by executing the control program. In the decoding, the code portion of the code 403 is sequentially decoded basically from the beginning to obtain each CCW (command code and parameter) and the CP 123 performs the corresponding CCW processing. When the control of the conditional branch such as "Go Next" command is described in the code portion CCW 405, the control is shifted to the step to be the jumping destination and performed in the DKC 102. Then, the processing of one code 403 is ended by executing "Return" command.

The PORT 121 obtains the code 403 from the receive buffer in which the frame 404 is stored in step S21. Next, the PORT 121 clears an offset counter in step S22. Next, the PORT 121 sequentially decodes the code portion of the code 403 according to the offset position indicated by the offset counter and obtains the CCW (command) 405 corresponding to the code portion in a step S23.

Next, the PORT 121 analyzes the command code of the obtained CCW 405 in step 24. As the result of the analysis, when the CCW 405 is Write command, the flow shifts to step S25, when it is "Test" command, the flow shifts to a step S28, when it is a control command such as the write control to the DK 131, the flow shifts to step S32 and when it is "Go Next" command corresponding to "Tic", the flow shifts to a step S35, respectively.

When the CCW 405 is the Write command, the PORT 121 transfers data to be written to the CM 122 in the step S25. Next, the CP 123 performs the conventional Write command processing in the step 26. Next, the offset is updated in the step S27 and the flow shifts to a step S39. When the CCW 405 is Read command, the process is performed in the same way.

When it is the "TEST" command, the PORT 121 transfers the parameter of the command to the CP 123 in the step S28. Next, the CP 123 performs the conventional "TEST" command processing in the step S29. The CP 123 determines according to the condition that is set in the command as the parameter. In the "TEST MEM" command processing, for example, the CP 123 compares the conditional value with the value of the memory area to determines whether the condition is matched or not. Next, the CP 123 stores the determination in the memory based on the "TEST" command processing in the step S30. Next, the offset is updated in the step S31 and the flow shifts to step S39.

When it is the control command, the PORT 121 transfers the parameter of the command to the CP 123 in the step S32. Next, the CP 123 performs the conventional control command processing in the step S33. Next, the offset is updated in the step S34 and the flow shifts to the step S39. An example of the control command is described in the above-described Japanese Patent Application Laid-Open Publication No. 2001-125866.

When it is the "Go Next" command, the PORT 121 transfers the parameter of the command to the CP 123 in the step S35. Next, the CP 123 refers the determination (S30) in the "TEST" command processing to determine whether the condition is matched or not. In the step 37, when the condition is matched, the offset is updated so as to advance one step and the flow shifts to the step S39. In the step 38, when the condition is not matched, the offset is updated so as to advance to the address of the parameter of the present command (i.e. the jumping destination) and the flow shifts to the step S39.

The PORT 121 checks the end state of the CCW processing based on the result of the CCW processing by the CP 123 in the step S39. Where, the port 121 checks the normal end or the abnormal end of the CCW processing and the RC. Next, the PORT 121 stores status information including DSB (device status byte) according to the end state of the CCW processing in a transmit buffer in step S40. Next, the PORT 121 checks the status information in step S41. When the RC as the status information does not exist, return to the step S23 is made and the PORT 121 continues the decoding and the CCW processing of the code 405 according to the position indicated by the counter in the same way. When the RC as the status information exists, the flow shifts to a step 42 and the PORT 121 creates the frame with set of the status information including the RC. The PORT 121 transmits the frame as a status response to the CH 113 of the host 101 and the process is ended.

<Effect and Another Embodiment>

As thus described above, since the host 101 creates the code 403 previously incorporating the control of the conditional branch as command progress control, the DKC 102 only sequentially decodes the code portions of the code 403 and performs them in order to control the command progress.

Accordingly, a plurality of CCWs including the conditional branch according to the state and the processing result in the DKC 102 can be batch-processed between the host 101 and the DKC 102. Thereby overhead in the channel can be reduced and traffic on the path can be reduced. Thus, the process performance can be improved. Additionally, a temporal synchronous process between the host 101 and the DKC 102 by interlocking such that the host 101 waits a response status from the DKC 102 is not required. Thus, the process performance can be improved. Conventionally, it was difficult to determine the end position of the CCW chain processing by means of the CCW counter. However, in the present embodiment, the end state and position can be clearly recognized by means of the RC in the host 101 and the DKC 102 and it is possible to speedily shift to the next process.

As another embodiment, the DKC 102 stores data and information such as CCW 405 received at the PORT 121 in the region such as the CM 122 and the SM 125 once, and the PORT 121 and the CP 123 may take out the stored data and information to process them. Additionally, the IP 111 may perform encode process by executing the encode program 115 in the host 101. A case that the created CCW 401 and CCW chain 402 are encoded to create the code 403 is described in the embodiment, however, the IP 111 may directly create the code 403 responsive to the desired processing. Additionally, the PORT 121 may perform a decoding and a command processing by executing the decode program 126 in the DKC 102.

While the present invention has been described with reference to the preferred embodiment, it is to be understood that the present invention is not intended to be limited to the above described embodiments, and various changes may be made therein without departing from the spirit of the present invention. While the present invention has been described with reference to the preferred embodiment, it is to be understood that the present invention is not intended to be limited to the above described embodiments, and various changes may be made therein without departing from the spirit of the present invention. It is also noted that the program described above for processing commands between a first data processing apparatus and a second data processing apparatus can be recorded on computer readable medium.

The present invention can be applied to a data processing system to perform one processing operation or job by a plurality of commands between the data processing apparatuses such as a mainframe data processing system.

What is claimed is:

1. A data processing system comprising:
   a data processing apparatus for issuing a command code; and
   a disk array apparatus communicatively connected to the data processing apparatus through a channel for performing command processing corresponding to the command code:
   the data processing apparatus comprising:
   an arithmetic processing unit for issuing a plurality of channel command words, the plurality of channel command words including a first command word for instructing to search according to a search content identified in a parameter in the first command word and for checking whether or not a result of the search matches to a conditional value identified in the parameter in the first command word, and a second command word for instructing to control a conditional branch, which, if a result of the search matches to the conditional value, advances to a next command word and, if the result of the search does not match to the conditional value, jumps to an address identified in a parameter in the second command word, and a third command word corresponding to the next command word, and a fourth command word, corresponding to the address identified in the parameter in the second command word and being a target to be jumped to, and a write command word for instructing to write data in the disk array apparatus;
   a storage unit for storing the plurality of channel command words issued by the arithmetic processing unit; and
   an input/output channel unit for transmitting the command code to the disk array apparatus, the command code being encoded with the plurality of channel command words, including a converted second command word instead of the second command word, after converting the second command word interpreted by the data processing apparatus into the converted second command word, which the disk array apparatus can interpret:
   the disk array apparatus comprising:
   an input/output port unit for receiving the command code from the data processing apparatus and for decoding the command code and for generating the plurality of channel command words including the converted second command;
   a cache memory unit for storing data to be stored in a plurality of storage areas;
   a control processor unit for sequentially processing each command word of the plurality of channel command words including the converted second command word obtained from the input/output port unit;
   wherein the control processor unit, if the write command word is processed, stores data of the write command word to the cache memory for storing the data of the write command to the plurality of storage areas,
   wherein the control processor unit, if the first command word is processed, searches according to the search content, which is identified in the parameter in the first command word and requests a search value of a memory area in the disk array apparatus, and checks whether or not a result of the search matches to the conditional value identified in the parameter in the first command word,
   wherein the control processor unit, if the second command word is processed, controls the conditional branch, which, if the result of the search matches to the conditional value, advances to the third command word and, if the result of the search does not match to the conditional value, jumps to the fourth command word corresponding to the address identified in the parameter in the second command word,
   wherein the control processor unit processes a parameter of either the third command word or the fourth command word based on the conditional branch, and returns status information representing the processing result to the input/output port unit, and
   wherein the input/output port unit transmits the status information as a response to the input/output channel unit in the data processing apparatus.

2. The data processing system according to claim 1, wherein
   the input/output channel unit in the data processing apparatus includes a return code corresponding to an end state and position of the processing according to the conditional branch in the command code during a period when the input/output channel unit encodes the plurality of channel command words including the converted second command word;

the status information includes the return code corresponding to the end state and the position of the processing according to the conditional branch; and the data processing apparatus recognizes the end state and the position of the processing based on the return code.

3. The data processing system according to claim 2, wherein the data processing apparatus reports the return code included in the status information to program which of the plurality of channel command words operating on the arithmetic processing unit is issued ; and the arithmetic processing unit determines a plurality of other channel command words to be issued subsequently when the return code indicates that the process is normally ended and the arithmetic processing unit performs a recovery processing of the plurality of channel command words corresponding to the end position when the return code indicates that the process is abnormally ended.

4. A data control method for a data processing system, the data processing system comprising a data processing apparatus for issuing a command code and a disk array apparatus communicatively connected to the data processing apparatus through a channel for performing command processing corresponding to the command code, the data control method comprising:

issuing, by the data processing apparatus, a plurality of channel command words, the plurality of channel command words including a first command word for instructing to search according to a search content identified in a parameter in the first command word and for checking whether or not a result of the search matches to a conditional value identified in the parameter in the first command word, and a second command word for instructing to control a conditional branch, which, if the result of the search matches to the conditional value, advances to a next command word and, if the result of the search does not match to the conditional value, jumps to an address identified in a parameter in the second command word, and a third command word corresponding to the next command word, and a fourth command word, corresponding to the address identified in a parameter in the second command word and being a target to be jumped to, and a write command word for instructing to write data in the disk array apparatus;

storing, by the data processing apparatus, the plurality of channel command words;

transmitting, by the data processing apparatus, the command code to the disk array apparatus, the command code being encoded the plurality of channel command words, including a converted second command word instead of the second command word, after converting the second command word interpreted by the data processing apparatus into the converted second command word, which the disk array apparatus can interpret:

receiving, by the disk array apparatus, the command code from the data processing apparatus;

decoding, by the disk array apparatus, the command code and generating the plurality of channel command words including the converted second command;

sequentially processing, by the disk array apparatus, each command word of the plurality of channel command words including the converted second command;

if the write command word is processed, storing, by the disk array apparatus, data of the write command word to a cache memory for storing the data of the write command to a plurality of storage areas;

if the first command word is processed, searching, by the disk array apparatus, according to the search content, which is identified in the parameter in the first command word and requesting a search value of a memory area in the disk array apparatus, and checking whether or not the result of the search matches to the conditional value identified in the parameter in the first command word;

if the second command word is processed, controlling, by the disk array apparatus, the conditional branch, which, if the result of the search matches to the conditional value, advances to the third command word and, if the result of the search does not match to the conditional value, jumps to the fourth command word corresponding to the address identified in the parameter in the second command word;

processing, by the disk array apparatus, a parameter of either the third command word or the fourth command word based on the conditional branch;

returning, by the disk array apparatus, status information representing a result of the processing to the input/output port unit; and transmitting, by the disk array apparatus, the status information as a response to the data processing apparatus.

5. The data control method according to claim 4, wherein the command code includes a return code corresponding to an end state and position of the processing according to the conditional branch, and the status information includes the return code corresponding to the end state and the position of the processing according to the conditional branch, the data control method further comprising:

recognizing, by the data processing apparatus, the end state and the position of the processing based on the return code.

6. The data control method according to claim 5, further comprising:

reporting, by the data processing apparatus, the return code included in the status information to program which of the plurality of channel command words is issued; and determining, by the data processing apparatus, a plurality of other channel command words to be issued subsequently when the return code indicates that the process is normally ended; and performing, by the data processing apparatus, a recovery processing of the plurality of channel command words corresponding to the end position when the return code indicates that the process is abnormally ended.

7. A computer program stored in a computer readable storage medium to be executable in a data processing system, the data processing system comprising a data processing apparatus for issuing a command code and a disk array apparatus communicatively connected to the data processing apparatus through a channel for performing command processing corresponding to the command code, the computer program comprising:

code issuing, by the data processing apparatus, a plurality of channel command words, the plurality of channel command words including a first command word for instructing to search according to a search content identified in a parameter in the first command word and for checking whether or not a result of the search matches to a conditional value identified in the parameter in the first command word, and a second command word for instructing to control a conditional branch, which, if a result of the search matches to the conditional value, advances to a next command word and, if the result of the search does not match to the conditional value, jumps to an address identified in a parameter in the second command word, and a third command word corresponding to the next command word, and a fourth command word, corresponding to the address identified in the parameter in the second command word and being targeted to be jumped to, and a write command word for instructing to write data in the disk array apparatus;

code storing, by the data processing apparatus, the plurality of channel command words;

code transmitting, by the data processing apparatus, the command code to the disk array apparatus, the command code being encoded with the plurality of channel command words, including a converted second command word instead of the second command word, after converting the second command word interpreted by the data processing apparatus into the converted second command word, which the disk array apparatus can interpret:

code receiving, by the disk array apparatus, the command code from the data processing apparatus;

code decoding, by the disk array apparatus, the command code and generating the plurality of channel command words including the converted second command;

code sequentially processing, by the disk array apparatus, each command word of the plurality of channel command words including the converted second command;

code, if the write command word is processed, storing, by the disk array apparatus, data of the write command word to a cache memory for storing the data of the write command to a plurality of storage areas;

code, if the first command word is processed, searching, by the disk array apparatus, according to a search content, which is identified in the parameter in the first command word and requesting a search value of a memory area in the disk array apparatus, and checking whether or not a result of the search matches to the conditional value identified in the parameter in the first command word;

code, if the second command word is processed, controlling, by the disk array apparatus, the conditional branch, which, if the result of the search matches to the conditional value, advances to the third command word and, if the result of the search does not match to the conditional value, jumps to the fourth command word corresponding to the address identified in the parameter in the second command word;

code processing, by the disk array apparatus, a parameter of either the third command word or the fourth command word based on the conditional branch;

code returning, by the disk array apparatus, status information representing a result of the processing result to the input/output port unit; and code transmitting, by the disk array apparatus, the status information as a response to the data processing apparatus.

8. The computer program according to claim 7, wherein the command code includes a return code corresponding to an end state and position of the processing according to the conditional branch, and the status information includes the return code corresponding to the end state and the position of the processing according to the conditional branch, the computer program further comprising:

code recognizing, by the data processing apparatus, the end state and the position of the processing based on the return code.

9. The computer program according to claim 8, further comprising:

code reporting, by the data processing apparatus, the return code included in the status information to program which of the plurality of channel command words is issued ; and code determining, by the data processing apparatus, a plurality of other channel command words to be issued subsequently when the return code indicates that the process is normally ended; and code performing, by the data processing apparatus, a recovery processing of the plurality of channel command words corresponding to the end position when the return code indicates that the process is abnormally ended.

* * * * *